US012180744B2

(12) United States Patent
Mali et al.

(10) Patent No.: US 12,180,744 B2
(45) Date of Patent: Dec. 31, 2024

(54) MOTION TRANSFORMATION

(71) Applicant: Rockwell Automation Technologies, Inc., Mayfield Heights, OH (US)

(72) Inventors: Girish Mali, Chelmsford, MA (US); Ryan Copeland, Watertown, MA (US); Burt Sacherski, Nashua, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 423 days.

(21) Appl. No.: 17/203,584

(22) Filed: Mar. 16, 2021

(65) Prior Publication Data

US 2022/0299093 A1 Sep. 22, 2022

(51) Int. Cl.
*E05B 1/00* (2006.01)

(52) U.S. Cl.
CPC .................................. *E05B 1/0038* (2013.01)

(58) Field of Classification Search
CPC . E05B 1/0038; E05C 1/14; E05C 1/45; E05C 3/08; E05C 3/12; E05C 3/14; E05C 3/145; E05C 9/02; E05C 9/025; E05C 9/10; E05C 9/14; Y10T 292/0834; Y10T 292/0845; Y10T 292/0838; Y10T 292/0976; Y10T 292/0972; Y10T 292/0995; Y10T 292/1016; Y10S 292/37
See application file for complete search history.

(56) References Cited

U.S. PATENT DOCUMENTS

| | | | | | |
|---|---|---|---|---|---|
| 514,511 | A * | 2/1894 | Sorensen | E05B 17/20 | 292/DIG. 25 |
| 720,462 | A * | 2/1903 | McVoy et al. | E05B 17/20 | 292/8 |
| 788,515 | A * | 5/1905 | Carlson | E05B 85/22 | 292/172 |
| 935,004 | A * | 9/1909 | Farch | E05C 1/14 | 292/170 |
| 970,934 | A * | 9/1910 | Leese | E05B 1/0038 | 70/491 |
| 1,061,177 | A * | 5/1913 | Hashim | E05B 55/005 | 70/357 |
| 1,086,462 | A * | 2/1914 | Randa | E05B 85/22 | 292/172 |

(Continued)

FOREIGN PATENT DOCUMENTS

KR 726876 B1 * 6/2007 ............. E05B 83/28

*Primary Examiner* — Christine M Mills
*Assistant Examiner* — Faria F Ahmad
(74) *Attorney, Agent, or Firm* — Foley & Lardner LLP

(57) ABSTRACT

For motion transformation an apparatus includes a key and a plunger. The key moves along a first axis in a linear key displacement direction and along the first axis in a linear key return direction that is opposite the key displacement direction. The key includes a motivating arm on a distal end. The motivating arm includes a displacement cam surface disposed on a ventral side of the motivating arm and a return cam surface disposed on a dorsal side of the motivating arm. The plunger moves along a second axis. The plunger includes a displacement interface that is motivated by the displacement cam surface in response to the key moving in the key displacement direction to motivate the plunger in a plunger displacement direction. The plunger further includes a return interface.

20 Claims, 17 Drawing Sheets

(56) References Cited

U.S. PATENT DOCUMENTS

| | | | | | | |
|---|---|---|---|---|---|---|
| 1,209,562 | A | * | 12/1916 | Cunningham | E05B 1/0038 | 70/393 |
| 1,211,437 | A | * | 1/1917 | Gruber | E05B 85/22 | 292/172 |
| 1,228,996 | A | * | 6/1917 | Walters | E05C 1/04 | 292/57 |
| 1,270,288 | A | * | 6/1918 | Gruber | E05C 1/14 | 220/DIG. 26 |
| 1,287,973 | A | * | 12/1918 | Gruber | E05C 1/14 | 292/170 |
| 1,469,590 | A | * | 10/1923 | Palmer | E05C 9/02 | 292/DIG. 32 |
| 1,777,176 | A | * | 9/1930 | Mcody | E05C 9/02 | 292/45 |
| 1,850,222 | A | * | 3/1932 | Carlson | E05C 9/02 | 292/33 |
| 2,683,978 | A | * | 7/1954 | Jacobi | E05B 1/0038 | 70/447 |
| 2,687,637 | A | * | 8/1954 | Jacobi | E05B 1/0038 | 70/379 R |
| 2,755,654 | A | * | 7/1956 | Valentine | E05C 9/02 | 292/DIG. 20 |
| 2,950,615 | A | * | 8/1960 | Schlage | E05B 1/0038 | 70/216 |
| 3,018,652 | A | * | 1/1962 | Dubonnet | E05B 1/0038 | 200/406 |
| 3,690,132 | A | * | 9/1972 | Engstrom | E05B 1/0038 | 292/DIG. 37 |
| 3,737,184 | A | * | 6/1973 | Swartz | E05C 1/14 | 292/336.3 |
| 3,890,814 | A | * | 6/1975 | Fantoni | E05B 17/0037 | 49/276 |
| 3,975,934 | A | * | 8/1976 | Babai | E05C 9/10 | 70/120 |
| 3,991,595 | A | * | 11/1976 | Bahry | E05C 9/14 | 70/120 |
| 4,039,214 | A | * | 8/1977 | Arends | E05B 1/0038 | 292/336.3 |
| 4,113,292 | A | * | 9/1978 | Gauron | E05C 1/166 | 292/336.3 |
| 4,195,867 | A | * | 4/1980 | Baillie | E05C 1/10 | 70/81 |
| 4,579,376 | A | * | 4/1986 | Charlton | E05B 47/026 | 292/144 |
| 4,667,492 | A | * | 5/1987 | Tomatsu | B60N 2/366 | 70/261 |
| 4,740,020 | A | * | 4/1988 | Williams | E05B 37/20 | 292/41 |
| 4,875,721 | A | * | 10/1989 | Okamoto | E05C 9/02 | 292/29 |
| 5,026,101 | A | * | 6/1991 | Dotterweich | E05C 1/14 | 292/170 |
| 5,219,191 | A | * | 6/1993 | Wolter | E05B 17/0037 | 292/DIG. 40 |
| 5,829,802 | A | * | 11/1998 | Anderson | E05B 7/00 | 292/336.3 |
| 6,048,001 | A | * | 4/2000 | Miller | E05C 3/24 | 292/220 |
| 6,105,858 | A | * | 8/2000 | Chien | G07G 1/0027 | 235/22 |
| 6,122,943 | A | * | 9/2000 | DaWalt | E05B 1/0038 | 70/371 |
| 6,148,650 | A | * | 11/2000 | Kibble | E05B 17/2088 | 70/110 |
| 6,234,547 | B1 | * | 5/2001 | Ruffino | E05B 15/101 | 292/336.3 |
| 6,739,162 | B1 | * | 5/2004 | Kondratuk | E05C 1/06 | 70/134 |
| 6,964,184 | B1 | * | 11/2005 | Gregory | E05B 1/0038 | 70/DIG. 56 |
| 7,188,871 | B2 | * | 3/2007 | Nemoto | E05B 77/42 | 292/121 |
| 2002/0089186 | A1 | * | 7/2002 | Wu | E05B 63/0021 | 292/138 |
| 2002/0105200 | A1 | * | 8/2002 | Reynolds | E05B 47/026 | 296/3 |
| 2002/0145292 | A1 | * | 10/2002 | Furner | E05B 65/0835 | 292/341.16 |
| 2002/0166356 | A1 | * | 11/2002 | Kuo | E05B 1/0038 | 70/360 |
| 2005/0156433 | A1 | * | 7/2005 | Nemoto | E05B 83/30 | 292/163 |
| 2006/0005589 | A1 | * | 1/2006 | Hanjono | B60R 7/06 | 70/208 |
| 2008/0295416 | A1 | * | 12/2008 | Kintz | E05B 63/0052 | 49/506 |
| 2010/0207403 | A1 | * | 8/2010 | Bourgoin | E05B 63/20 | 292/335 |
| 2010/0237637 | A1 | * | 9/2010 | Camp | E05B 1/0038 | 292/358 |
| 2011/0018285 | A1 | * | 1/2011 | Mitchell | E05C 9/1891 | 292/161 |
| 2011/0248516 | A1 | * | 10/2011 | Liang | E05B 1/0038 | 292/173 |
| 2011/0316397 | A1 | * | 12/2011 | Sabelli | E05B 65/462 | 292/226 |
| 2012/0159750 | A1 | * | 6/2012 | Liu | F16B 21/02 | 24/598.4 |
| 2013/0328327 | A1 | * | 12/2013 | Loret de Mola | E05C 1/085 | 292/169 |
| 2015/0152665 | A1 | * | 6/2015 | Camp | E05B 1/0038 | 292/137 |
| 2019/0106907 | A1 | * | 4/2019 | Pavlik | E05B 61/00 | |
| 2022/0325567 | A1 | * | 10/2022 | Camp | E05C 1/04 | |

* cited by examiner

MOTION TRANSFORMATION

BACKGROUND INFORMATION

The subject matter disclosed herein relates to motion transformation.

BRIEF DESCRIPTION

An apparatus for motion transformation is disclosed. The apparatus includes a key and a plunger. The key moves along a first axis in a linear key displacement direction and along the first axis in a linear key return direction that is opposite the key displacement direction. The key includes a motivating arm on a distal end. The motivating arm includes a displacement cam surface disposed on a ventral side of the motivating arm and a return cam surface disposed on a dorsal side of the motivating arm. The plunger moves along a second axis. The plunger includes a displacement interface that is motivated by the displacement cam surface in response to the key moving in the key displacement direction to motivate the plunger in a plunger displacement direction. The plunger further includes a return interface.

A system for motion transformation is disclosed. The system includes a cabinet, a key, a button, and a plunger. The key moves along a first axis in a linear key displacement direction in the cabinet and along the first axis in a linear key return direction that is opposite the key displacement direction. The key includes a motivating arm on a distal end. The motivating arm includes a displacement cam surface disposed on a ventral side of the motivating arm and a return cam surface disposed on a dorsal side of the motivating arm. The plunger moves along a second axis in the cabinet. The button motivates the key in the key displacement direction. The plunger includes a displacement interface that is motivated by the displacement cam surface in response to the key moving in the key displacement direction to motivate the plunger in a plunger displacement direction. The plunger further includes a return interface.

A method for motion transformation is also disclosed. The method provides a key and a plunger. The key includes a motivating arm on a distal end. The motivating arm includes a displacement cam surface disposed on a ventral side of the motivating arm and a return cam surface disposed on a dorsal side of the motivating arm. The plunger includes a displacement interface that is motivated by the displacement cam surface. The method moves the key along the first axis in the key displacement direction. The method further moves the plunger in the plunger displacement direction in response to the displacement cam surface motivating the displacement interface.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
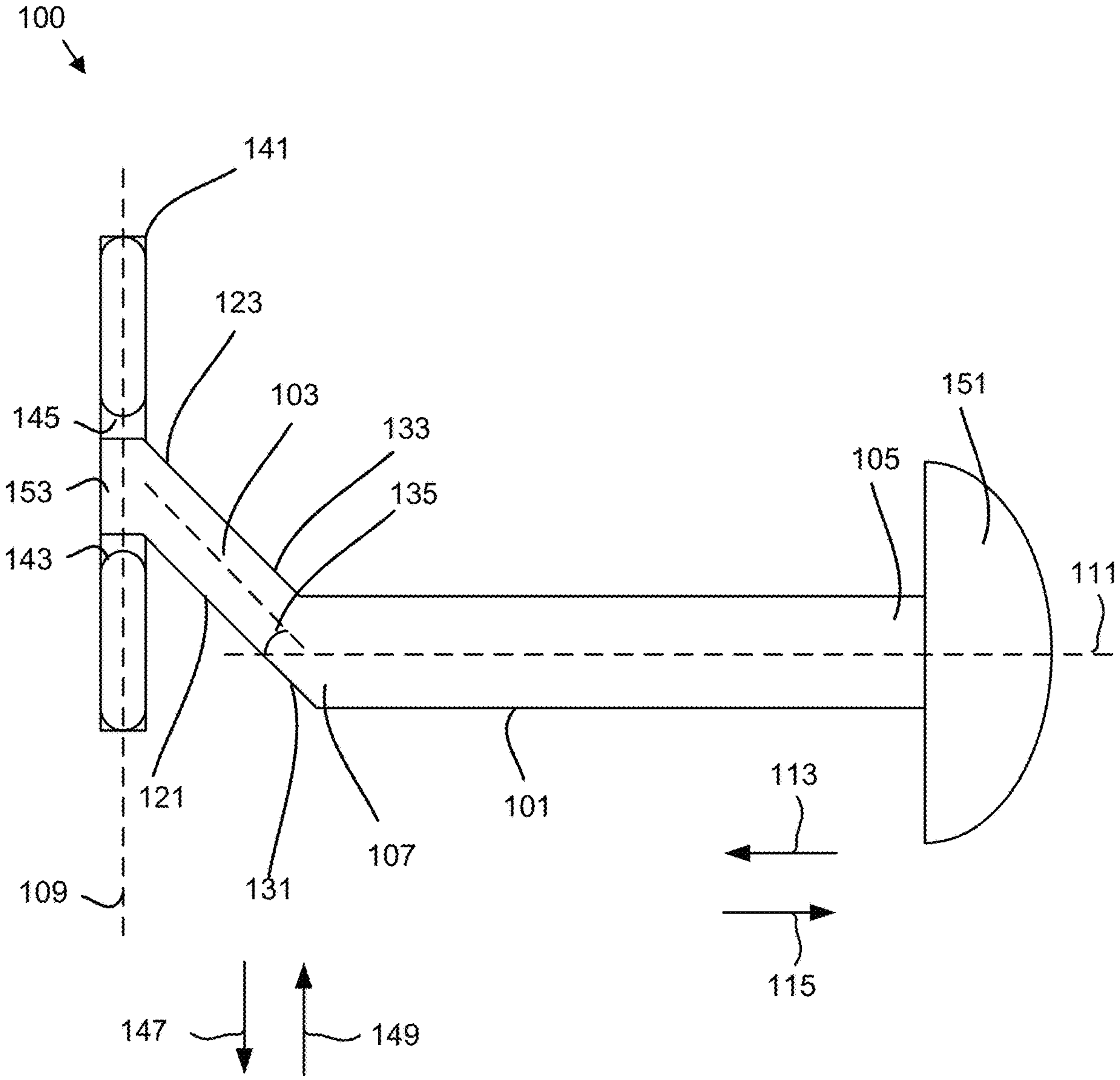
FIG. 1 is a side view drawing of a motion transformation apparatus according to an embodiment.

FIG. 1 is a side view drawing of a motion transformation apparatus 100. The apparatus 100 transforms motion along a first axis 111 into motion along a second axis 109. A manual force may be available from a user along the first axis 111. In addition, a powered force may be applied along the first axis 111. However, the force may need to be applied along the second axis 109. For example, a locking bolt may be disengaged and/or engaged with a force along the second axis 109. Unfortunately, the most convenient and/or practical manual motion and/or powered force that can be used to generate a force to disengage and/or engage the locking bolt may be available along the first axis 111. The embodiments herein transform the motion from along the first axis 111 into motion along the second axis 109.

In the depicted embodiment, the apparatus 100 includes a key 101 and a plunger 141. The key 101 is constrained to move along the first axis 111. The key 101 may be constrained by a channel. The key 101 may be motivated to move in a key displacement direction 113. The key displacement direction 113 may be linear. In addition, the key may be motivated to move in a key return direction 115 that is opposite the key displacement direction 113. The key return direction 115 may be linear. The key 101 may comprise a motivating arm 103 on a distal end 107. The motivating arm 103 may comprise a displacement cam surface 121 disposed on a ventral side 131 of the motivating arm 103 and a return cam surface 123 disposed on a dorsal side 133 of the motivating arm 103.

The motivating arm 103 may be at an arm angle 135 in a range of 15 to 60 degrees from the first axis 111. The arm angle may be 45 degrees. In one embodiment, the motivating arm 103 includes an arm end 153. The motivating arm 103 is described in more detail in FIGS. 3A-C and 4A-C.

The key 101 and/or the displacement cam surface 121 and the return cam surface 123 may be fabricated of stainless steel. In addition, the key 101 and/or the displacement cam surface 121 and the return cam surface 123 may be non-magnetic. In one embodiment, the key 101 and components thereof may be of sufficient strength to motivate force welded contacts. In one embodiment, the key 101 comprises a button 151 disposed on a proximal end 105. The button 151 may be connected via a thread. The button 151 may receive a manual force.

The plunger 141 may be constrained to move along the second axis 109. The plunger 141 is described in more detail in FIGS. 5A-B. The plunger 141 includes a displacement interface 143 that is motivated by the displacement cam surface 121 of the key 101 moving in the key displacement direction 113. The motivation of the displacement interface 143 by the displacement cam surface 121 motivates the plunger 141 in a plunger displacement direction 147. Thus, the key 101 moving in the key displacement direction 113 motivates the plunger 141 in the plunger displacement direction 147. In the depicted embodiment, the first axis 111 is orthogonal to the second axis 109.

The plunger 141 may further comprise a return interface 145. The return interface 145 may be motivated by the return cam surface 123 in response to the key 101 moving in the key return direction 115 to move the plunger 141 in a plunger return direction 149 that is opposite the plunger displacement direction 147.

Figure 2A:
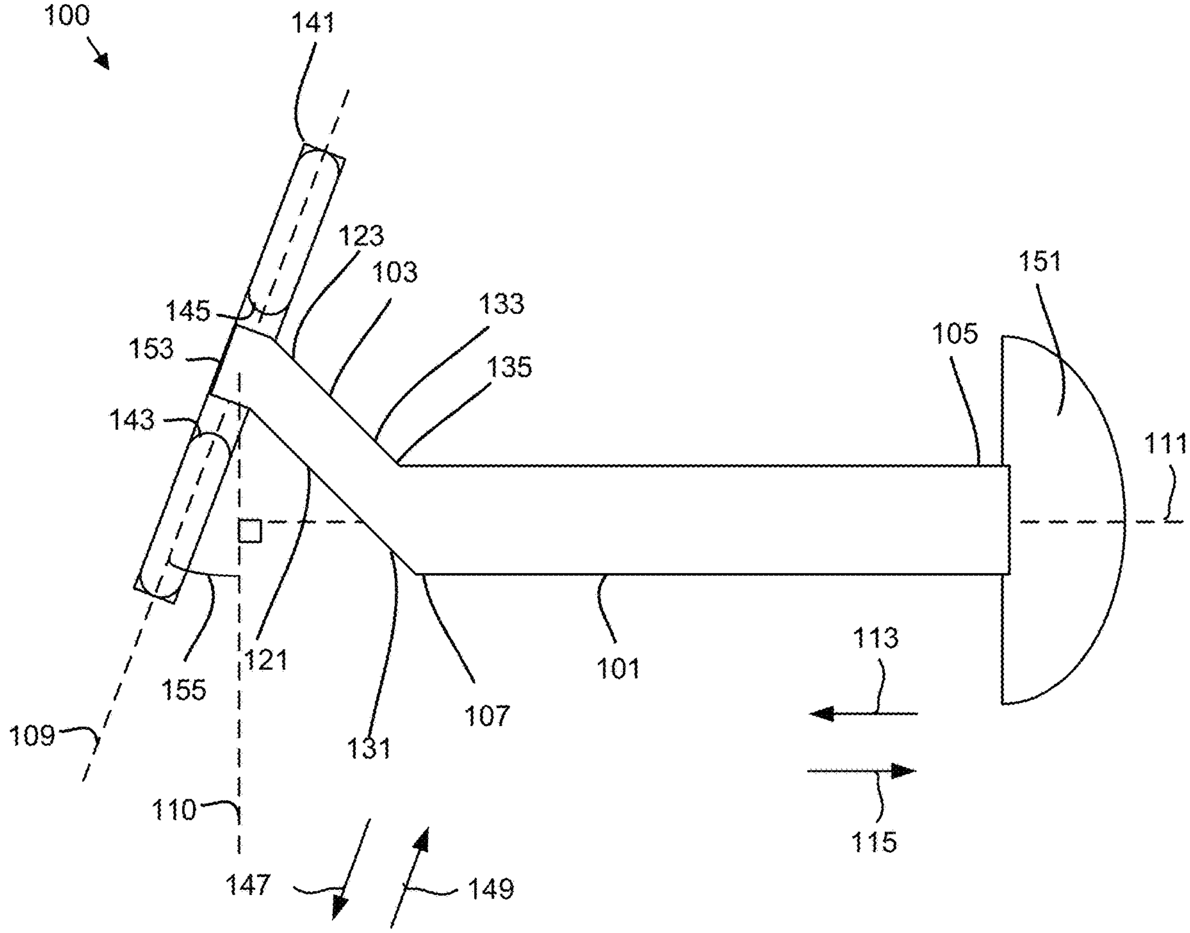
FIG. 2A is a side view drawing of a motion transformation apparatus according to an alternate embodiment.

FIG. 2A is a side view drawing of the motion transformation apparatus 100. The key 101 and the plunger 141 of FIG. 1 are shown. In one embodiment, the first axis 111 is within 30 degrees of orthogonal 110 to the second axis 109. In the depicted embodiment, the first axis 111 is offset from orthogonal 110 to the second axis 109 by a reference angle 155. The reference angle 155 may be less than 45 degrees. In one embodiment, the reference angle 155 is no greater than 30 degrees.

Figure 2B:
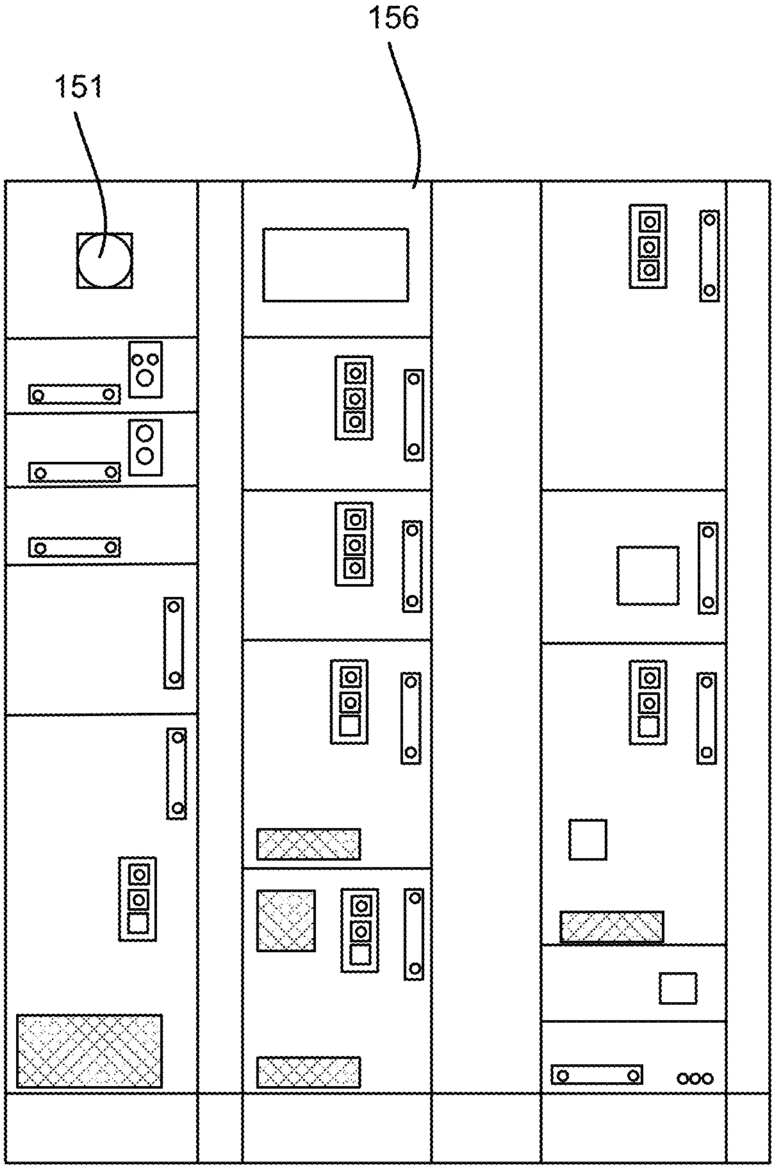
FIG. 2B is a front view drawing of a cabinet according to an embodiment.

FIG. 2B is a front view drawing of a cabinet 156. The button 151 is depicted on the cabinet 156 with the motion transformation apparatus 100 within the cabinet 156.

Figure 3A:
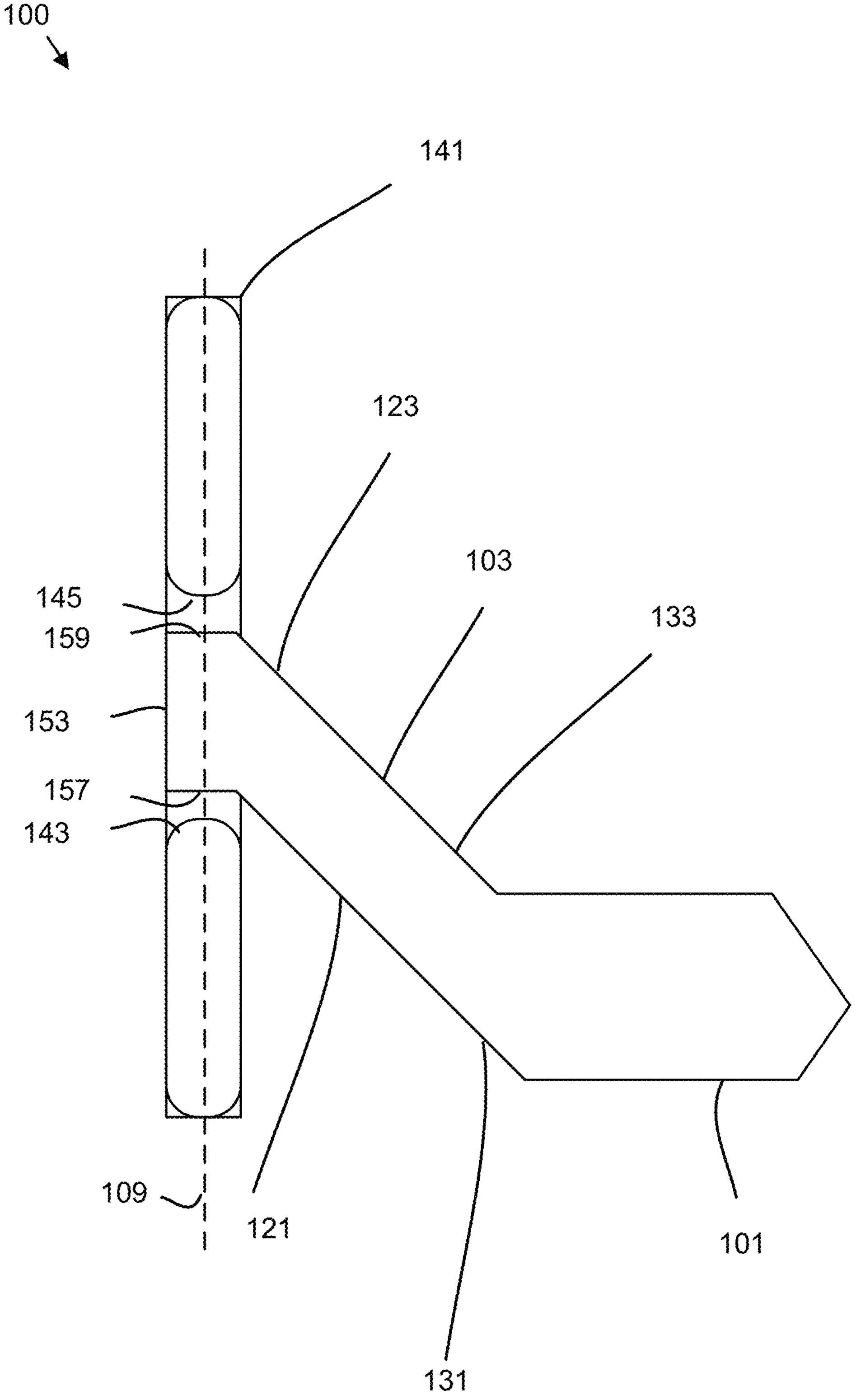
FIG. 3A is a side view drawing of a motion transformation apparatus according to an embodiment.

FIG. 3A is a side view drawing of the motion transformation apparatus 100. In particular, the motivating arm 103 is shown. In the depicted embodiment, the arm end 153 comprises a displacement surface 157 that is within 20 degrees of normal to the second axis 109. The arm end 153 may further include a return surface 159 that is within 20 degrees of normal to the second axis 109.

Figure 3B:
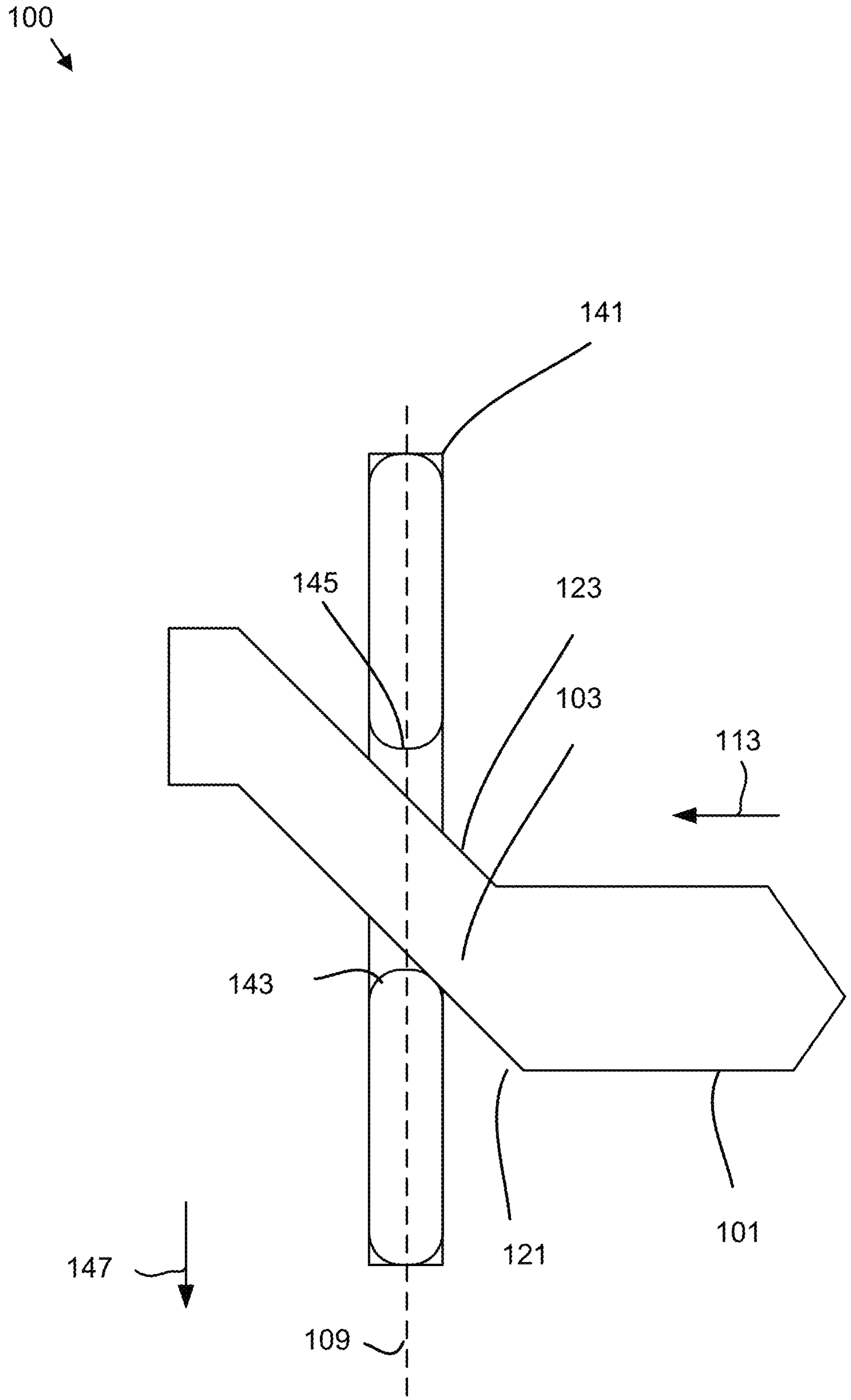
FIG. 3B is a side view drawing of a motivated motion transformation apparatus according to an embodiment.

FIG. 3B is a side view drawing of the motivated motion transformation apparatus 100. In the depicted embodiment, the key 101 is motivated in the key displacement direction 113, which motivates the displacement cam surface 121 against the displacement interface 143. The motivation of the displacement interface 143 by the displacement cam surface 121 motivates the plunger 141 in a plunger displacement direction 147.

Figure 3C:
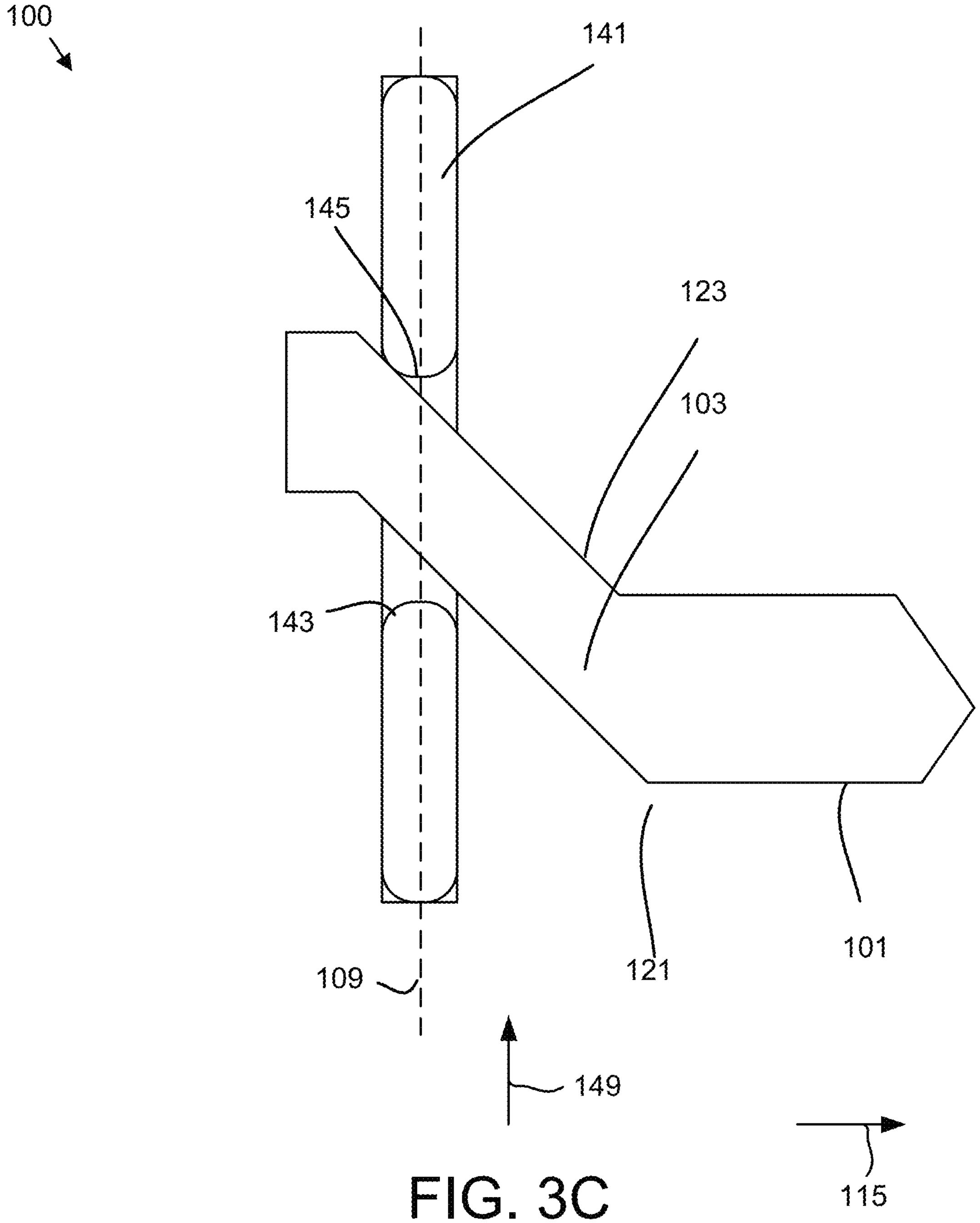
FIG. 3C is a side view drawing of a motivated motion transformation apparatus according to an embodiment.

FIG. 3C is a side view drawing of the motivated motion transformation apparatus 100. In the depicted embodiment, the key 101 is motivated in the key return direction 115, which motivates the return cam surface 123 against the return interface 145. The motivation of the return interface 145 by the return cam surface 123 motivates the plunger 141 in the plunger return direction 149.

Figure 4A:
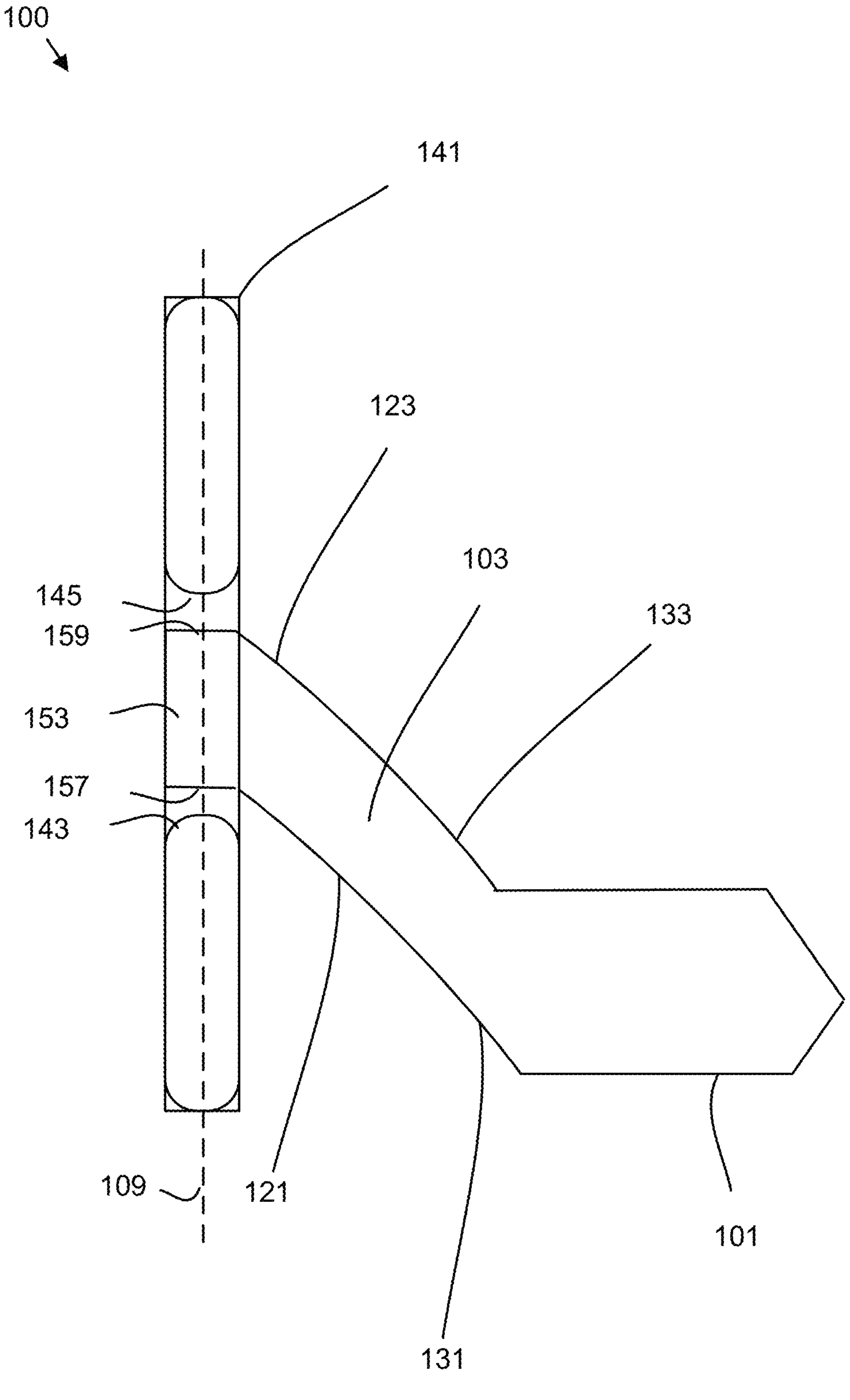
FIG. 4A is a side view drawing of a motion transformation apparatus according to an alternate embodiment.

FIG. 4A is a side view drawing of the motion transformation apparatus 100. In the depicted embodiment, the displacement cam surface 121 and/or the return cam surface 123 are a spline and/or in the shape of a spline. The spline may have an exponential curve.

Figure 4B:
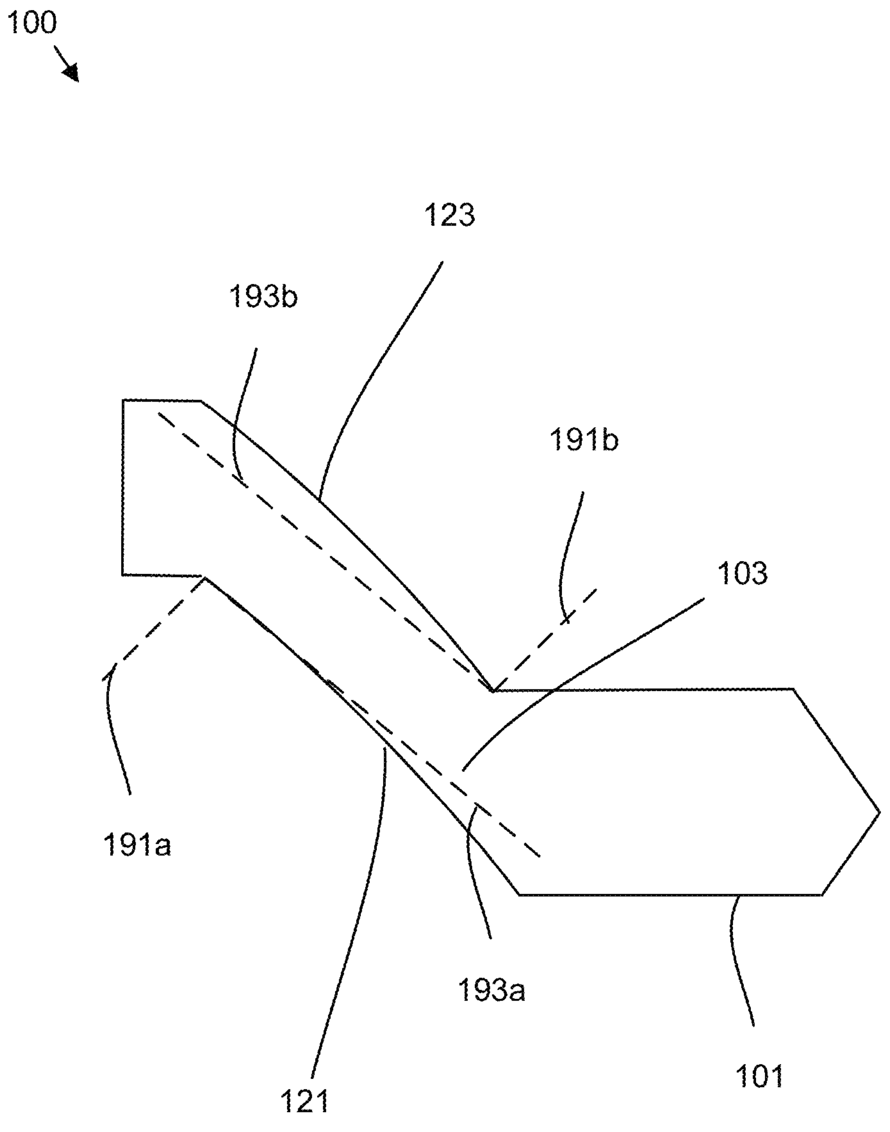
FIG. 4B is a side view drawing of a motion transformation apparatus according to an alternate embodiment.

FIG. 4B is a side view drawing of the motion transformation apparatus 100 of FIG. 4A. The spline may generate constant acceleration in the plunger displacement direction 147 and/or the plunger return direction 149. In one embodiment, the curve is given by Equation 1, where y 191 and x 193 are coordinates in a plane that includes the first axis 111 and the second axis 109 and k and m are nonzero constants. The depicted embodiment shows positive y 191*a* and positive x 193*a* for the displacement cam surface 121 and positive y 191*b* and positive x 193*b* for the return cam surface 123.

$$y=(kx)^2+m \qquad \text{Equation 1}$$

The spline may generate increasing acceleration in the plunger displacement direction 147 and/or the plunger return direction 149. In one embodiment, the curve is given by Equation 2, where y 191 and x 193 are coordinates and k and m are nonzero constants.

$$y=(kx)^3+m \qquad \text{Equation 2}$$

The spline may generate decreasing acceleration in the plunger displacement direction 147 and/or the plunger return direction 149. In one embodiment, the curve is given by Equation 3, where y 191 and x 193 are coordinates and k and m are nonzero constants.

$$y=(kx)^{\circ 5}+m \qquad \text{Equation 3}$$

In one embodiment, the displacement cam surface 121 and/or the return cam surface 123 are stepwise functions, wherein intervals along the displacement cam surface 121 and/or the return cam surface 123 are pairwise disjoint and where the union of the intervals is the entire displacement cam surface 121 and/or the return cam surface 123.

Figure 4C:
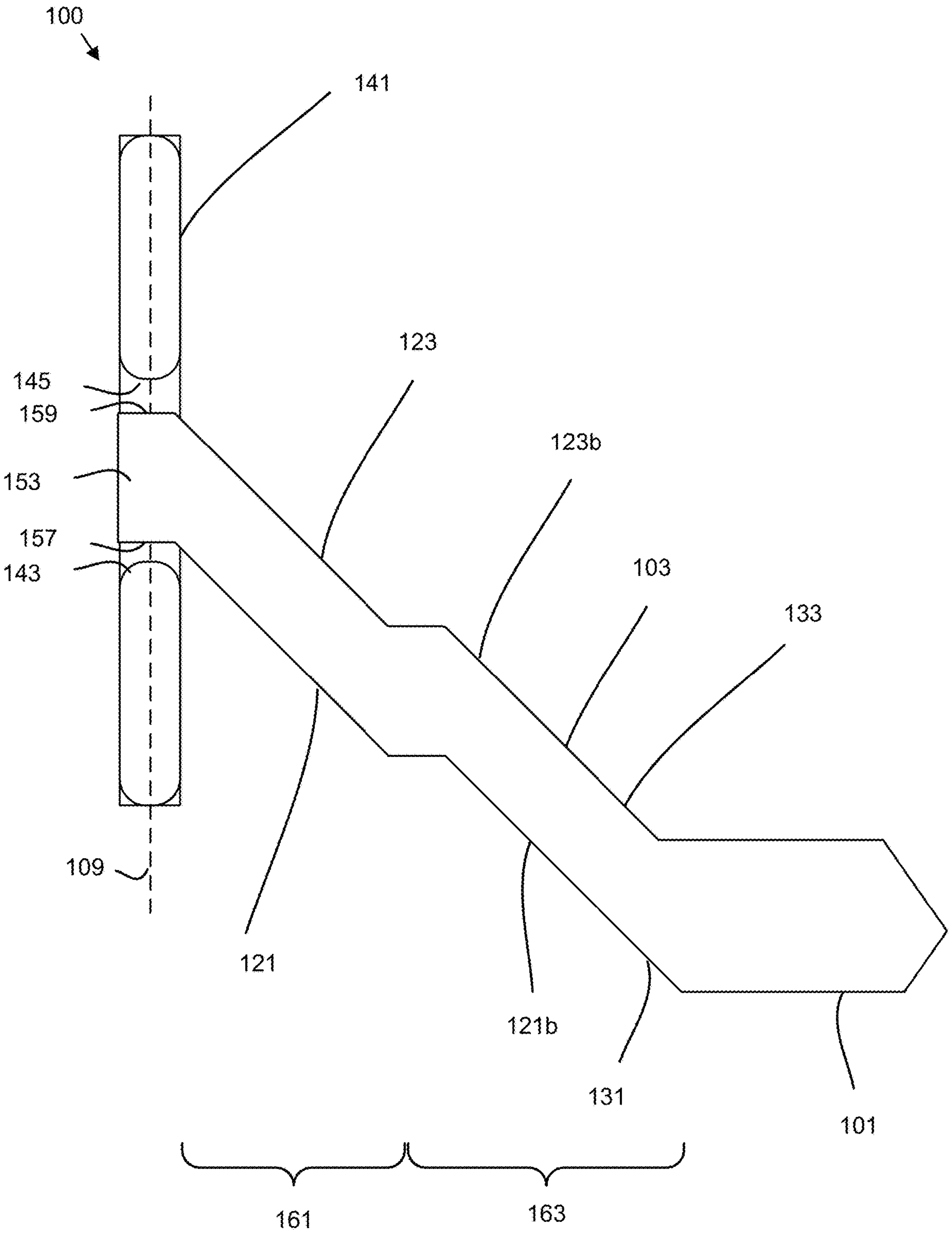
FIG. 4C is a side view drawing of a motion transformation apparatus according to an alternate embodiment.

FIG. 4C is a side view drawing of the motion transformation apparatus 100. In the depicted embodiment, the motivating arm 103 further comprises a secondary displacement cam surface 121*b* disposed on the ventral side 131 that motivates the displacement interface 143 to motivate the plunger 141 in the plunger displacement direction 147 in response to the key 101 moving in the key displacement direction 113 a secondary distance 163. Thus, the key 101 moving a primary distance 161 causes the displacement cam surface 121 to motivate the plunger 141 and the key 101 moving the secondary distance 163 causes the secondary displacement cam surface 121*b* to further motivate the plunger 141 and the plunger displacement direction 147.

In the depicted embodiment, the motivating arm 103 further comprises a secondary return cam surface 123*b* disposed on the dorsal side 133 that motivates the return interface 145 in response to the key 101 moving the second distance 163 in the key return direction 115 to move the plunger 141 in the plunger return direction 149.

Figure 5A:
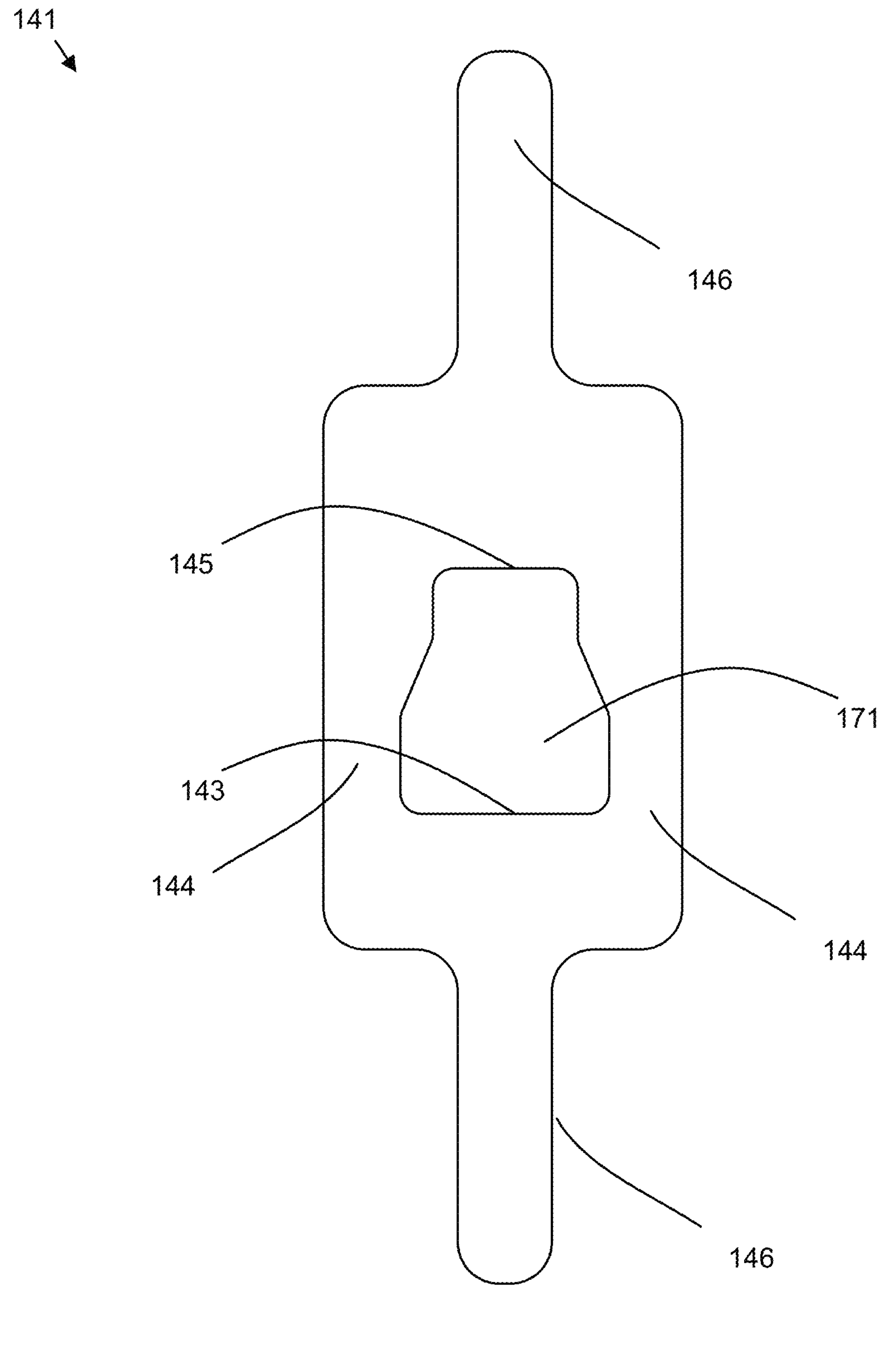
FIG. 5A is a back view drawing of a plunger according to an embodiment.

FIG. 5A is a back view drawing of the plunger 141. In the depicted embodiment, the plunger 141 includes at least one rod 146. Rod(s) 146 may motivate one or more other components. In addition, rod(s) 146 may be disposed within a channel that constrains the motion of the plunger 141.

At least one interface support 144 connects the displacement interface 143 and the return interface 145. In the depicted embodiment, two interface supports 144 are disposed on either side of the displacement interface 143 and the return interface 145. The displacement interface 143 and the return interface 145 are shown disposed on an inner surface of an orifice 171 formed by the interface supports 144. The orifice 171 may narrow to retain a poka-yoke as will be shown hereafter.

Figure 5B:
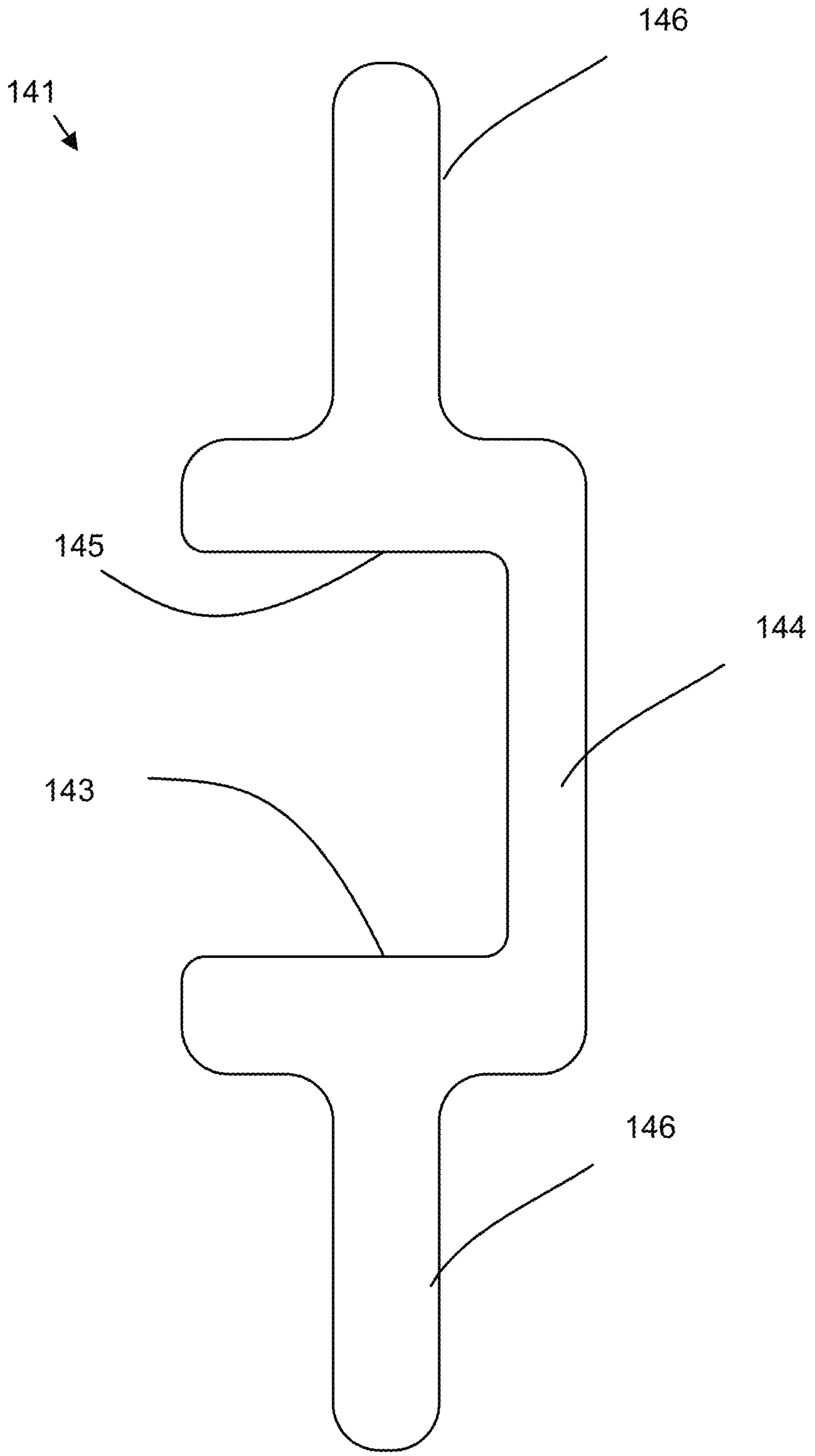
FIG. 5B is a back view drawing of a plunger according to an alternate embodiment.

FIG. 5B is a back view drawing of a plunger 141. In the depicted embodiment, one interface support 144 connects the displacement interface 143 and the return interface 145.

Figure 6A:
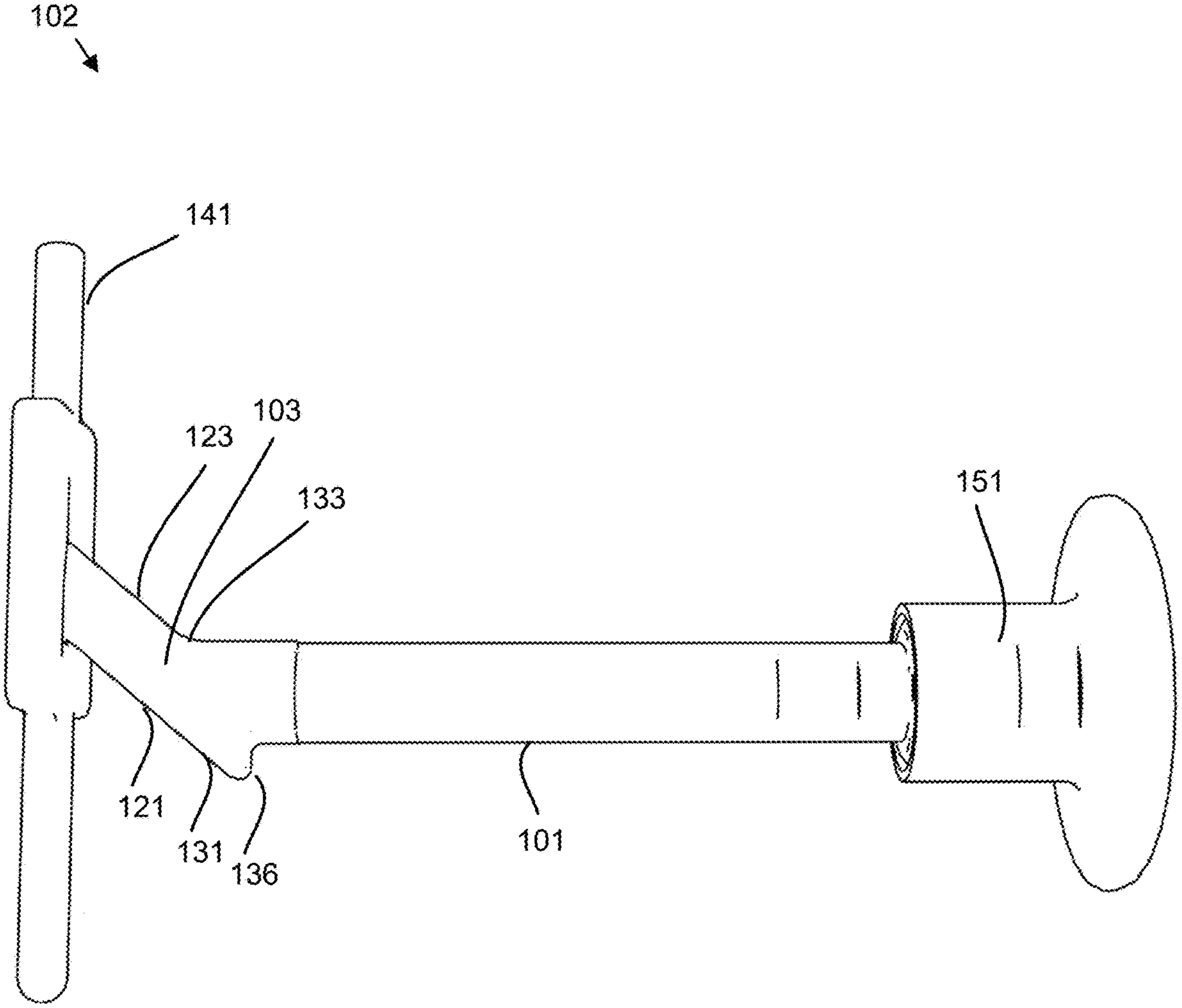
FIG. 6A is a side view drawing of a motion transformation system according to an embodiment.

FIG. 6A is a side view perspective drawing of a motion transformation system 102. The key 101 and the plunger 144 are shown. In the depicted embodiment, the motivating arm 103 includes a displacement cam extension 136. The displacement cam extension 136 may increase the primary distance 161. In addition, the displacement cam extension 136 may allow the spline of the displacement cam surface 121 to be configured to increase and/or decrease acceleration over the primary distance 161.

Figure 6B:
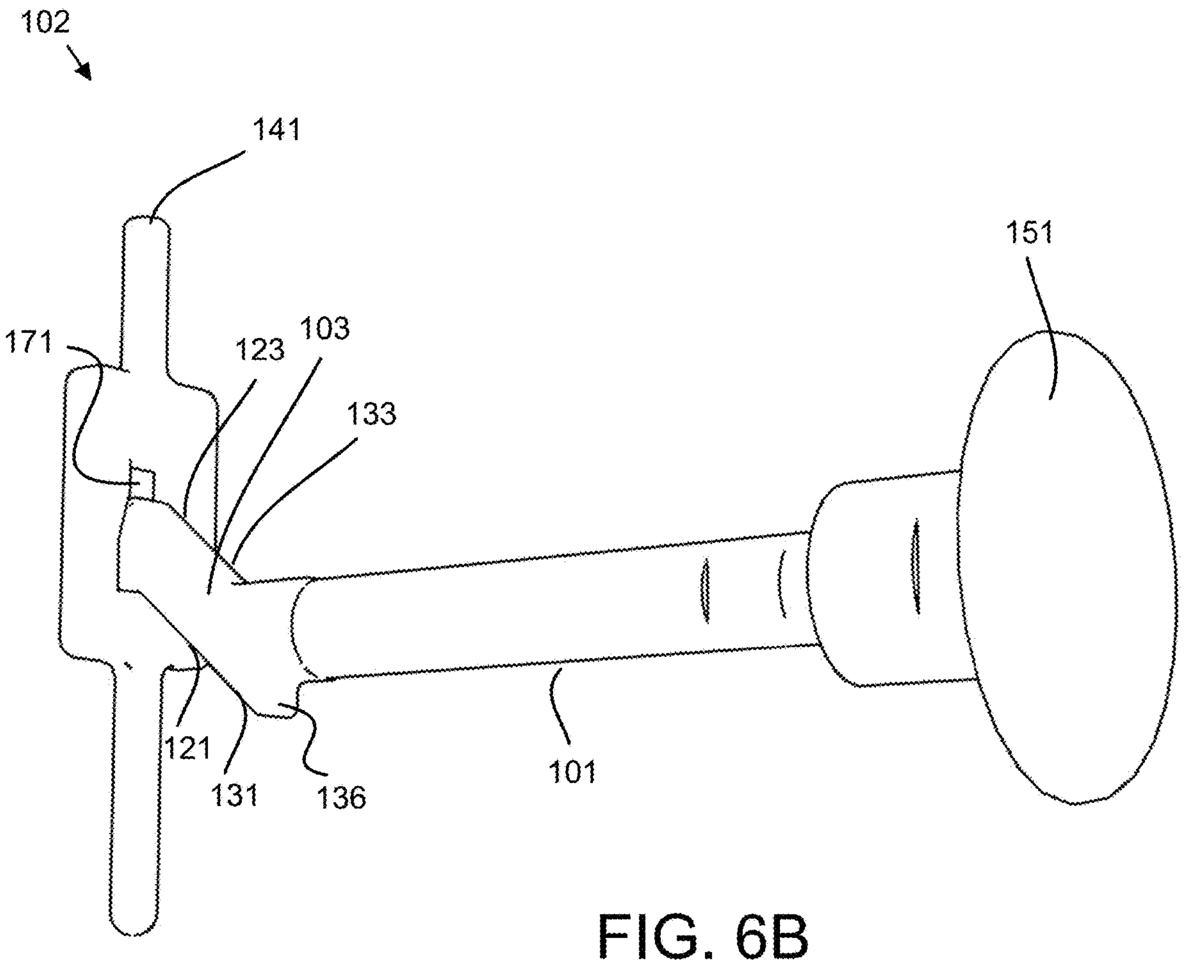
FIG. 6B is a perspective drawing of a motion transformation system according to an embodiment.

FIG. 6B is a perspective drawing of the motion transformation system 102. The arm end 153 with the orifice 171 is shown.

Figure 6C:
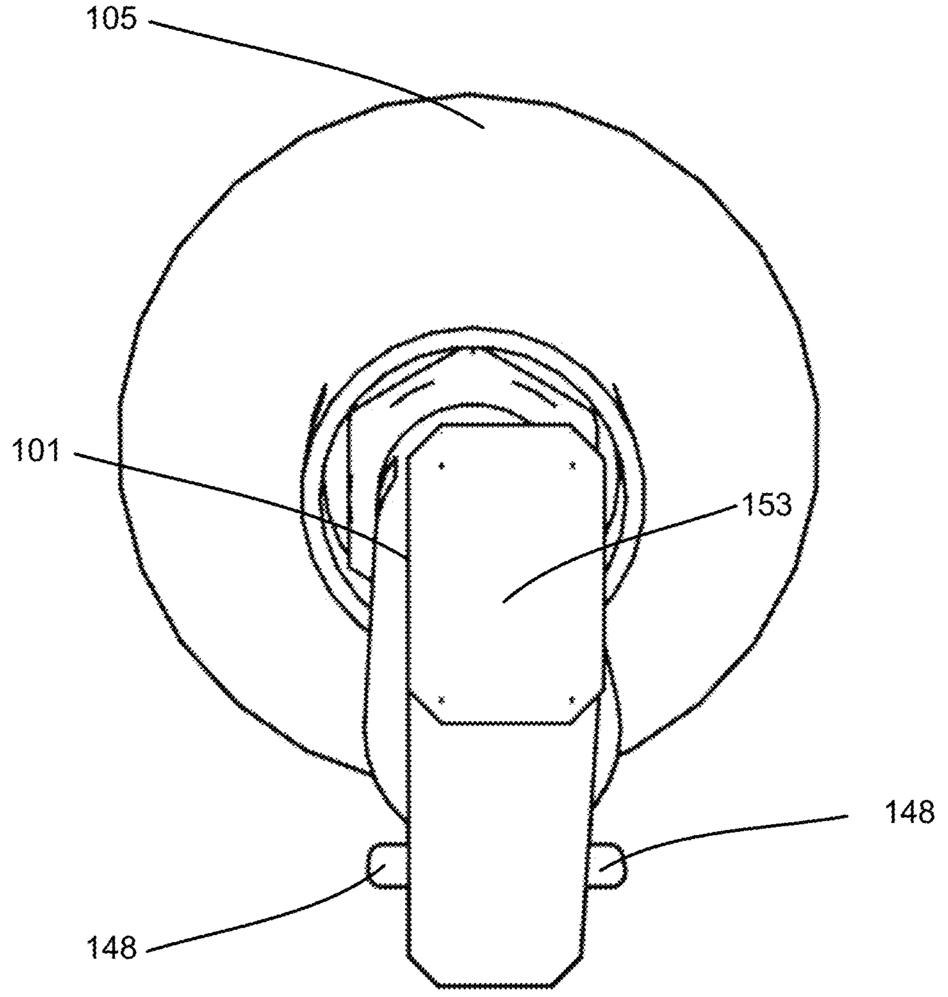
FIG. 6C is a back view drawing of the key according to an embodiment.

FIG. 6C is a back view drawing of the key 101. The poka-yoke 148 is depicted on the motivating arm 103. The poka-yoke 148 may pass through the wide portion of the orifice 171 and not pass through the narrow portion of the orifice 171. As a result, the key 101 cannot be inserted upside down.

Figure 6D:
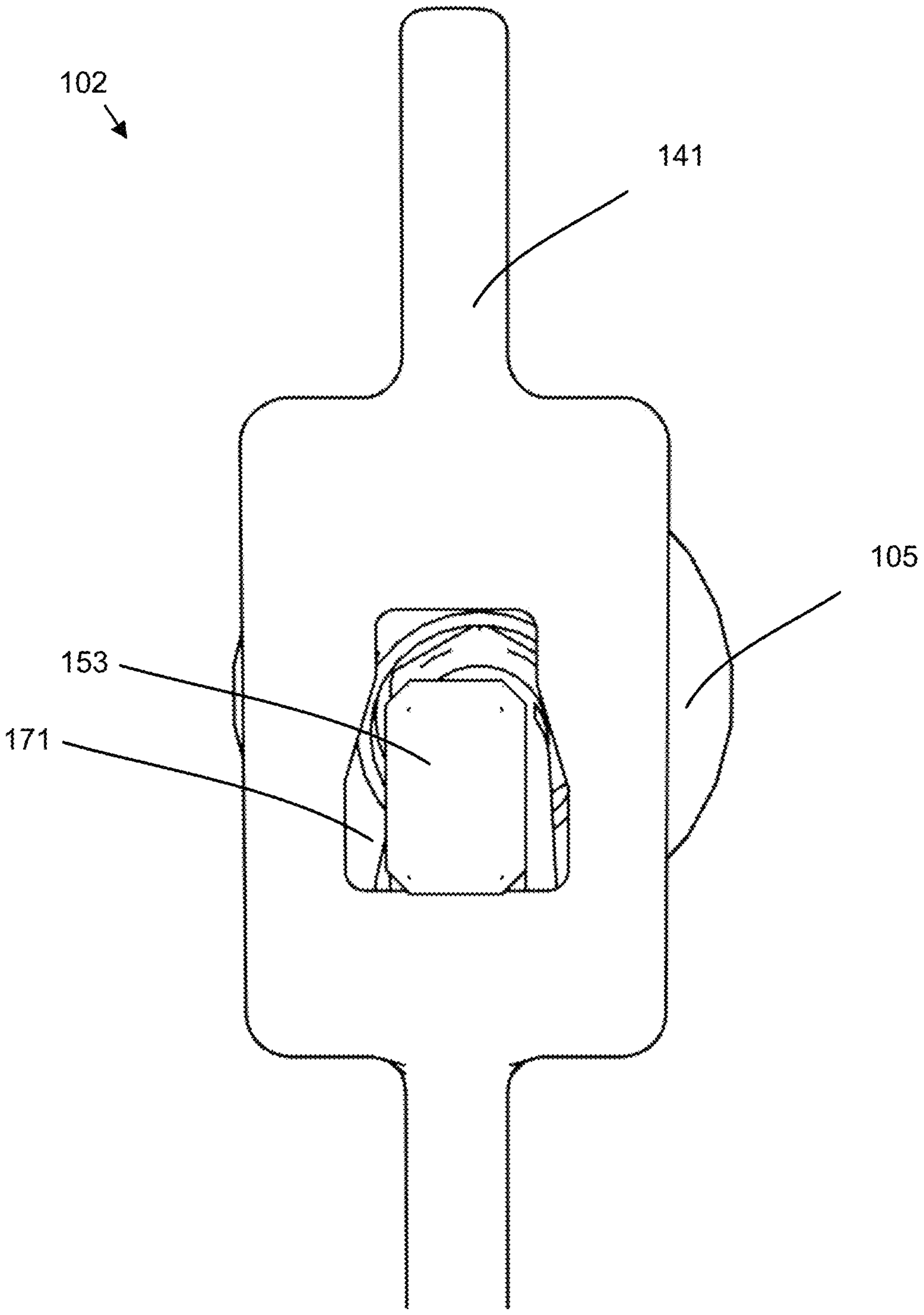
FIG. 6D is a back view drawing of a motion transformation system according to an embodiment.

FIG. 6D is a back view drawing of the motion transformation system 102. The arm end 153 is shown extending through the orifice 171.

Figure 7:
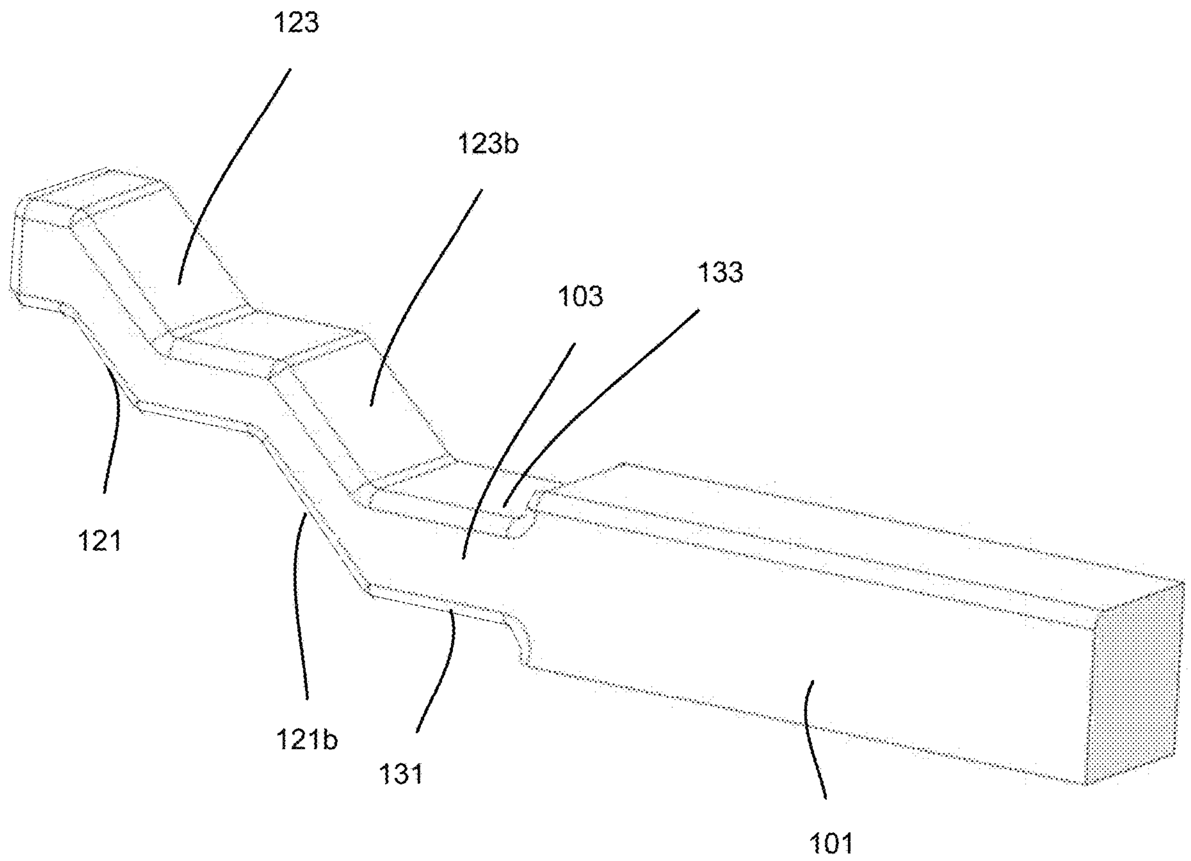
FIG. 7 is a perspective drawing of a key according to an embodiment.

FIG. 7 is a perspective drawing of a key 101. In the depicted embodiment, the secondary displacement cam surface 121*b* and the secondary return cam surface 123*b* are shown.

Figure 8:
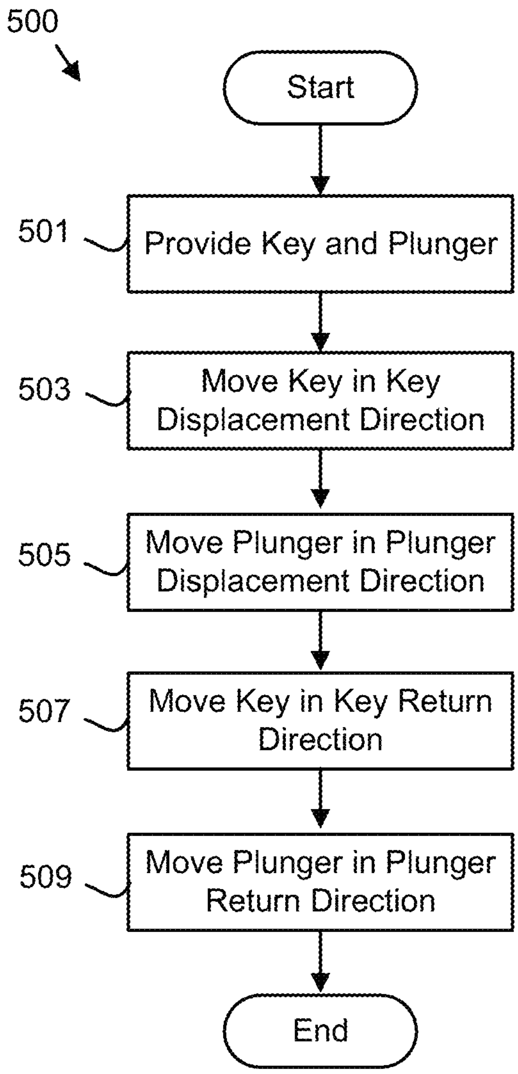
FIG. 8 is a schematic flow chart diagram of a motion transformation method according to an embodiment.

FIG. 8 is a schematic flow chart diagram of a motion transformation method 500. The method 500 transforms motion along the first axis 111 to motion along the second axis 109. The method 500 may be performed by the motion transformation system 102 and/or the motion transformation apparatus 100.

The method 500 starts, and in one embodiment, the method provides 501 the key 101 and the plunger 141. The method 500 further moves 503 the key 101 along the first axis 111 in the key displacement direction 113. In response, the displacement cam surface 121 motivates the displacement interface 143 to move 505 the plunger 141 in the plunger displacement direction 147.

The method 500 further moves 507 the key 101 along the first axis 111 in the key return direction 115. In response the return cam surface 123 motivates the return interface 145 to move 509 the plunger 141 in the plunger return direction 149 and the method 500 ends.

Problem/Solution

Motion along the first axis 111 may be needed to apply a force and/or motivation along the second axis 109. Such motion transformation is often needed for safety controls, where a manual force along the first axis 111 must be applied along the second axis 109. The embodiments provide a key 101 that moves along the first axis 111 in the key displacement direction 113. The key 101 includes a motivating arm with the displacement cam surface 121. As the key 101 moves in the key displacement direction 113, the displacement cam surface 121 motivates the displacement interface 143 to motivate the plunger 141 in the plunger displacement direction 147 along the second axis 109. As a result, the motion applied to the key 101 is efficiently and effectively transferred via the plunger 141 along the second axis 109.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:

a key comprising a motivating arm that moves along a first axis in a linear key displacement direction and along the first axis in a linear key return direction that is opposite the key displacement direction, the motivating arm on a distal end of the key, the motivating arm comprising a displacement cam surface disposed on a ventral side of the motivating arm and a return cam surface disposed on a dorsal side of the motivating arm, wherein the motivating arm is at an arm angle in a range of 15 to 60 degrees from the first axis; and a plunger that moves along a second axis, the plunger comprising:

a displacement interface that is moved by the displacement cam surface coming in contact with and applying a force to the displacement interface in response to the key moving in the key displacement direction to move the plunger in a plunger displacement direction, and a return interface that is moved by the return cam surface coming in contact with and applying a force to the return interface in response to the key moving in the key return direction to move the plunger in a plunger return direction that is opposite the plunger displacement direction.

2. The apparatus of claim 1, wherein the displacement cam surface and/or the return cam surface are a spline.

3. The apparatus of claim 2, wherein the spline has an exponential curve.

4. The apparatus of claim 3, wherein the spline has a curve given by y=−k×2+m.

5. The apparatus of claim 1, wherein the displacement cam surface and/or the return cam surface are stepwise functions.

6. The apparatus of claim 1, wherein the motivating arm further comprises a secondary displacement cam surface disposed on the ventral side that motivates the displacement interface to motivate the plunger in the plunger displacement direction in response to the key moving in the key displacement direction a secondary distance.

7. The apparatus of claim 6, wherein the motivating arm further comprises a secondary return cam surface disposed on the dorsal side that motivates the return interface in response to the key moving the second distance in the key return direction to move the plunger in the plunger return direction.

8. The apparatus of claim 1, wherein the first axis is orthogonal to the second axis.

9. The apparatus of claim 1, wherein the first axis is within 30 degrees of orthogonal to the second axis.

10. The apparatus of claim 1, the plunger comprising at least one rod and at least one interface support that connects the displacement interface and the return interface.

11. The apparatus of claim 10, wherein the displacement interface and the return interface are disposed on an inner surface of a poka-yoke formed by the at least one interface support.

12. The apparatus of claim 1, wherein the motivating arm further comprises an arm end with a displacement surface that is within 20 degrees of normal to the second axis and a return surface that is within 20 degrees of normal to the second axis.

13. The apparatus of claim 1, the key further comprising a button disposed on a proximal end.

14. A system comprising:
the apparatus of claim 1;
a cabinet; and
a button that motivates the key in the key displacement direction.

15. The system of claim 14, wherein the displacement cam surface and/or the return cam surface are a spline.

16. A method comprising:
providing a key and a plunger, wherein the key comprises a motivating arm on a distal end of the key, the motivating arm comprising a displacement cam surface disposed on a ventral side of the motivating arm and a return cam surface disposed on a dorsal side of the motivating arm, wherein the displacement cam surface and/or the return cam surface are stepwise functions and the plunger comprises a displacement interface that is moved by the displacement cam surface and a return interface that is moved by the return cam surface;
moving the motivating arm of the key along the first axis in a key displacement direction;
moving the plunger along a second axis in a plunger displacement direction in response to the displacement cam surface moving the displacement interface, wherein the displacement cam surface moves the displacement interface by coming in contact with and applying a force to the displacement interface;
moving the key along the first axis in a key return direction opposite the key displacement direction; and
moving the plunger along the second axis in a plunger return direction that is opposite the plunger displacement direction in response to the return cam surface moving the return interface, wherein the return cam surface moves the return interface by coming in contact with and applying a force to the return interface.

17. An apparatus comprising:
a key comprising a motivating arm that moves along a first axis in a linear key displacement direction and along the first axis in a linear key return direction that is opposite the key displacement direction, the motivating arm on a distal end of the key, the motivating arm comprising a displacement cam surface disposed on a ventral side of the motivating arm and a return cam surface disposed on a dorsal side of the motivating arm, wherein the displacement cam surface and/or the return cam surface are stepwise functions; and
a plunger that moves along a second axis, the plunger comprising:
a displacement interface that is moved by the displacement cam surface coming in contact with and applying a force to the displacement interface in response to the key moving in the key displacement direction to move the plunger in a plunger displacement direction, and
a return interface that is moved by the return cam surface coming in contact with and applying a force to the return interface in response to the key moving in the key return direction to move the plunger in a plunger return direction that is opposite the plunger displacement direction.

18. A system comprising:
the apparatus of claim 17;
a cabinet; and
a button that motivates the key in the key displacement direction.

19. The system of claim 18, wherein the displacement cam surface and/or the return cam surface are a spline.

20. The system of claim 18, wherein the motivating arm is at an arm angle in a range of 15 to 60 degrees from the first axis.

* * * * *